United States Patent [19]

Finnemore et al.

[11] 4,179,205
[45] Dec. 18, 1979

[54] STROBE-LIGHT APPARATUS FOR USE WITH PHOTOGRAPHIC CAMERA

[75] Inventors: Fred M. Finnemore, North Reading; Robert A. Goodwin, Braintree, both of Mass.

[73] Assignee: Polaroid Corporation, Cambridge, Mass.

[21] Appl. No.: 884,471

[22] Filed: Mar. 8, 1978

[51] Int. Cl.² .............................................. G03B 15/03
[52] U.S. Cl. .................................................... 354/145
[58] Field of Search ............... 362/3, 8; 354/126, 145, 354/295; 24/73 SG, 73 PF, 81 E, 81 R

[56] References Cited

U.S. PATENT DOCUMENTS

| | | | |
|---|---|---|---|
| 3,936,067 | 2/1976 | Link | 24/73 SG X |
| 3,943,532 | 3/1976 | De Fillipis | 354/126 |
| 3,967,302 | 6/1976 | Cote et al. | 354/295 |
| 3,967,303 | 6/1976 | Fischer et al. | 354/295 |
| 4,095,242 | 6/1978 | Tsunekawa et al. | 354/145 X |
| 4,106,077 | 8/1978 | Furda | 362/8 |

OTHER PUBLICATIONS

Kalimar Strobe Advertisement, K-474 for Polaroid SX70 and Alpha Cameras, Kalimar Inc., Chesterfield, Mo.

*Primary Examiner*—Donald A. Griffin
*Attorney, Agent, or Firm*—Francis J. Caufield

[57] ABSTRACT

A compact, elongated strobe-light apparatus is provided for use with a photographic camera of the folding-reflex type having a collapsible viewing device. The strobe-light apparatus includes an attaching arrangement by which it can easily be mounted on and removed from the camera. The attaching arrangement includes a flash plug mounted near the apparatus's forward end and a pair of spaced apart flexible fingers mounted near its rear end for releasably gripping the rear end of the camera's viewing device. The configuration of the flash plug in combination with the "gripping" fingers permits the apparatus to be attached to the camera either by first sliding its rear end into engagement with a cover of the viewing device and thereafter rotating the apparatus to insert its plug into the camera's flash socket or, alternatively, by first snap-connecting its rear end to the viewing device's cover and then rotating the apparatus to insert the flash plug. Camming surfaces are provided to automatically effect the release of the grip of the flexible fingers in response to rotating the apparatus—front end first—away from the camera.

2 Claims, 6 Drawing Figures

STROBE-LIGHT APPARATUS FOR USE WITH PHOTOGRAPHIC CAMERA

BACKGROUND OF THE INVENTION

1. Field of the Invention

This invention relates to photographic apparatus and, more particularly, to a compact strobe-light apparatus for use with a folding-reflex type camera having a collapsible viewing device.

2. Description of the Prior Art

Cameras of the type with which the strobe-light apparatus of the present invention is most useful have been in common use for several years (e.g., Polaroid SX-70 Land Camera) and are extensively described in the patent literature as, for example, in U.S. Pat. No. 3,714,879 issued to Edwin H. Land et al. on Feb. 6, 1973 and entitled "Reflex Camera."

Such cameras are single-lens, folding-reflex types which utilize self-processable type film and, with only nominal effort on the part of the photographer, operate in a virtually automatic manner to produce finished, waste-free, color photographs.

They accomplish this with a complex system architecture comprising a number of specially designed interdependent subsystems that are organized to carry out a pre-programmed series of sequential operations which ultimately produce the finished print.

Each subsystem comprises either complex solid-state circuits, electro-mechanical devices, or optics which provide such functions as automatic exposure control and film transport and processing.

However, the complexity of these cameras is not immediately apparent since it is concealed within a clean exterior design that makes them both aesthetically appealing, and easy to handle and operate. This is accomplished through optimum utilization of interior space-incorporating subsytems where they will take up the least space and yet yield maximum performance. When folded, for example, these cameras assume a compact, pocket-sized shape (7×4×1 inch) which makes them easy to transport, and when erected, they assume a clean prismatic shape.

However, the clean exterior design which makes these cameras attractive also makes it difficult to provide compact, aesthetically pleasing accessories or strobe-light apparatus for use with these cameras without disturbing the camera's handling characteristics or creating problems in the function of the camera's collapsible viewing device.

For example, U.S. Pat. No. 3,967,303 issued to Richard V. Fischer et al on June 29, 1976 and entitled "Accessory for Cameras" describes an accessory attachment which comprises a specially configured housing for mounting the accessories therein (e.g., an electronic strobe), and hook elements and a plug—both secured to the housing—which cooperate to locate and detachably secure the attachment to the camera. The Fischer et al. attachment is relatively bulky, appearing to be about the same size as the camera. In addition, it appears that most of the weight of the Fischer et al attachment is concentrated in its front end. When attached to the camera, this attachment would tend to make the camera front heavy thereby causing the user to shift his hand toward the forward end of the camera to support the increased weight introduced by the accessory attachment. This type camera, however, should be supported near its rear end since exposed film units exit through its front end; the danger of course being that the user's hand is more likely to interfere with the exiting film if located near the camera's front end.

Another accessory attachment is described in U.S. Pat. No. 3,967,302 issued to Gerald J. Cote et al on June 29, 1976 and entitled "Accessory Attachment for Photographic Apparatus." Like the attachment of Fischer et al, supra, the Cote et al. attachment tends to disturb the balance of the camera by making the combination front heavy.

An electronic flash unit is described in U.S. patent application Ser. No. 749,313 by John P. Burgarella et al and entitled "Electronic Flash Apparatus With Extendable On/Off Switch Apparatus", now U.S. Pat. No. 4,685,414. The flash unit described here also tends to make the camera-flash unit combination front heavy.

U.S. Pat. No. 3,943,532 issued to John De Fillipis on Mar. 9, 1976 and entitled "Flash Attachment for Self-Developing Collapsible Cameras" describes a xenon flash illumination system comprising separate power-pack and flash-lamp assemblies. The base of the camera nests in the power-pack assembly and the flash-lamp assembly plugs into the camera's flash socket. This two part illumination system also appears to be bulky.

Kalimar, Inc. of Chesterfield, MO, manufactures a compact, elongated strobe (Model K-474) for use with the Polaroid SX-70 Land Camera. The Kalimar strobe is adapted to attach to the camera by sliding over the cover of its collapsible viewfinder. However, this strobe, when mounted on the viewing device's cover tends to interfere with the user's ability to look through the viewing device and also has the added problem of potentially collapsing the viewing device which is held erect by a spring-loaded linkage system.

Therefore, it is a primary object of the present invention to provide compact strobe-light apparatus for use with cameras of the type characterized above.

Another object of the present invention is to provide strobe-light apparatus which can be easily attached to and removed from such cameras, and when attached, does not disturb the inherent balance of the camera nor interfere with the operation of its collapsible viewing device.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

This invention relates to a photographic strobe-light apparatus for use with a folding-reflex camera of the type which includes a shutter-lens housing having a front wall behind which is mounted an automatic exposure control system and through which extends an objective-taking lens having an optical axis therethrough and a rearwardly extending top wall having a centrally disposed, downwardly extending, elongated flash socket which includes electrical contacts for providing an electrical signal from the automatic exposure control system to the apparatus during an exposure cycle of the camera. Additionally included in the camera is a viewing device which includes an elongated cover of given width and a pair of spaced apart longitudinal side walls extending in a direction from the camera's front end to its rear end.

The strobe-light apparatus comprises an elongated housing including a front wall having an aperture therein, a rear wall spaced from the front wall, and a generally flat bottom wall extending between the front and rear walls.

Also included is a flash tube which is mounted within the elongated housing in predetermined alignment with the aperture of said front wall.

Control means, responsive to the signal from the camera's automatic exposure control system, are included for energizing the flash tube.

Further included is an elongated, blade-like flash plug which is mounted adjacent the elongated housing's front wall and extends downwardly and generally perpendicular to the bottom wall of the elongated housing. The flash plug is structured to fit the camera's flash socket so that, when inserted into the flash socket, the flash plug and the flash socket, in combination, support the front end of the apparatus on the camera. Also the flash plug is provided with electrical contacts for mating with the electrical contacts of the flash socket to provide an electrically conducting path along which the signal from the camera's automatic exposure control system is transmitted to the apparatus's control means.

Also provided are means for releasably gripping the lower edges of the longitudinal side walls of the viewing device's cover, adjacent the rear end of the cover, to support the rear end of the apparatus adjacent the rear end of the viewing device's cover. The gripping means are located adjacent the rear wall of the elongated housing, depending downwardly from the elongated housing's bottom wall, and are structured either to be initially slidably engaged with the cover's longitudinal side walls and then rotated with respect thereto so that the apparatus's rear end can be slid into engagement with the cover's rear end after which the apparatus can be rotated with respect to its rear end to insert the flash plug into the flash socket to complete the attachment of the apparatus to the camera or, alternatively, to initially effect a snap-type connection about the lower edges of the cover's longitudinal side walls so that the apparatus's rear end can be engaged with the cover's longitudinal side walls by pushing the apparatus's rear end against the cover in a direction generally perpendicular to the cover after which the apparatus can be rotated with respect to its rear end to insert the flash plug into the flash socket to complete the attachment of the apparatus to the camera.

An important feature of the preferred embodiment of the invention is the provision of the gripping means with camming means which are structured to automatically effect the release of the gripping means in response to rotation of the apparatus about its rear end by first detaching the apparatus's front end from the camera's flash socket and then rotating the apparatus's front end with respect to its rear end.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
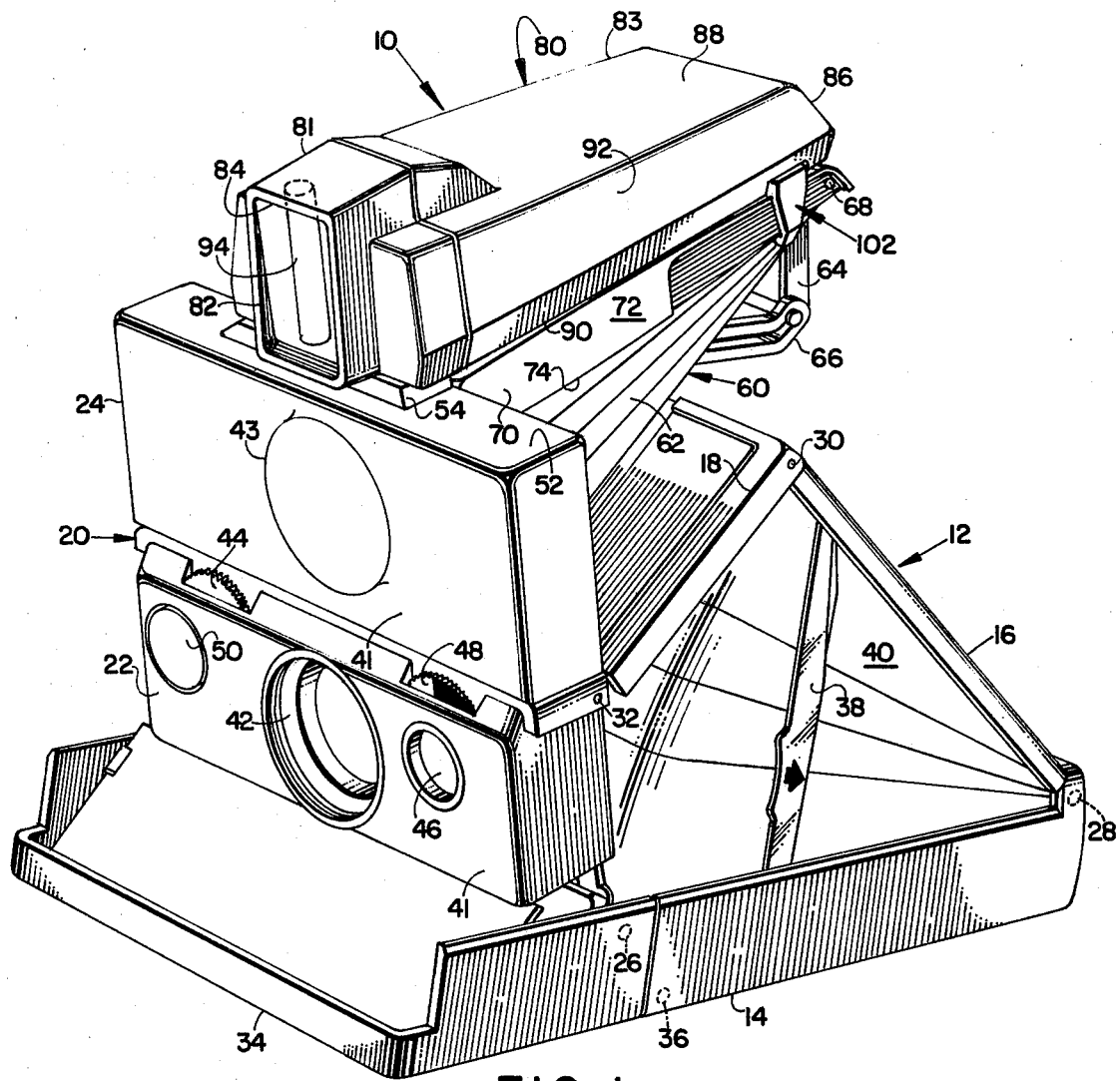
FIG. 1 is a perspective view showing the photographic strobe-light apparatus of the invention attached to a folding-reflex type camera which is shown in an erected-operative position.

Referring now to FIG. 1, there is shown a photographic strobe-light apparatus 10 which is the preferred embodiment of the present invention. The strobe-light 10 is shown attached to an automatic, folding-reflex camera 12 which utilizes self-processable, integral type film units and is provided in a well-known manner with a distinct ambient exposure mode of operation and a distinct flash exposure mode of operation in which the strobe-light 10 can be utilized to illuminate a scene to be photographed.

The camera 12 is collapsible as more fully described in the aforementioned U.S. Pat. No. 3,714,789, but is shown in its extended-operative position in FIG. 1 wherein it can be seen to comprise a plurality of housing members including a base housing member 14, a rear housing member 16, an upper housing member 18, and a shutter-lens housing member 20.

The housing members 14, 16, 18 and 20 are pivotally coupled to one another at pivots 26, 28, 30 and 32 (only one of each shown) to form a collapsible four-bar linkage so that the camera 12 may be folded into a flat, compact shape (not shown) suitable for transport and storage.

The camera 12 is maintained in its extended-operative position by a well-known erecting arrangement that includes an erecting link 38 which locks the housing members 14, 16, 18 and 20 in the predetermined spatial arrangement illustrated in FIG. 1 so that their geometric integrity is maintained while the camera 12 is being operated. The erecting link 38 may be manually disengaged in a well-known manner to interrupt the locking relationship between the housing members 14, 16, 18 and 20 to facilitate folding the camera 12.

An additional housing member 34 is hinged to the base housing member 14 via a pair of spaced apart pivots 36 (only one shown). The member 34 is normally latched in the position shown in FIG. 1 but can be unlatched and swung down to uncover the entrance to a film cassette receiving chamber (not shown) located in the base housing member 14 and adapted in a well-known manner to receive a film cassette (also not shown) of the type which includes a stacked array of self-processable film units under which is positioned a flat, thin battery which can be used to provide power to the various electrical components of the camera 12. An example of such a film cassette is disclosed and described in considerable detail in, for example, U.S. Pat.

No. 3,872,487 issued to Nicholas Gold on Mar. 18, 1975 and entitled "Photographic Film Assemblage and Apparatus."

When the film cassette is located in the base housing member 14, it is surrounded by a light-tight enclosure formed by the aforementioned housing members in combination with an opaque collapsible bellows 40.

The shutter-lens housing 20 includes a lower section 22 having a vertically extending upper section 24 depending therefrom.

Extending through a front wall 41 of the shutter-lens housing 20 is an objective-taking lens 42 which, in a well-known manner, directs light from a scene onto film of a cassette located in the base housing member 14.

Disposed within the lower section 22, behind the front wall 41, is a well-known automatic exposure control system (not shown) which, among other things, generates appropriate electrical signals for operating the strobe-light 10. An example of such an exposure control system is described in considerable detail in U.S. Pat. No. 3,820,128 issued to John P. Burgarella et. al. on June 25, 1974, and entitled "Flash Photographic Control System."

Also disposed within the lower section 22 and extending through the front wall 41 is a photometer system, generally designated at 46, which forms part of the automatic exposure control system; a manually operable exposure trim wheel 48 which cooperates with the photometer 46 to adjust its response in a known manner; a focus wheel 44 which may be manually operated to focus the objective-taking lens 42; and a camera actuating button 50 for initiating a camera operating cycle during which exposure takes place.

The upper section 24 of the shutter-lens housing 20 houses an automatic system (not shown) for focusing the objective-taking lens 42. The automatic focusing system may be of the type more fully described in U.S. patent application Ser. No. 838,581, filed on behalf of John C. Ostrowski et. al. on Oct. 3, 1977, entitled "Auto/Manual Focus Control Inhibit/Override," and assigned in common herewith.

Front wall 41 of the upper section 24 includes a centrally disposed transducer 43 which operates to transmit and receive signals to and from an object to be focused by the objective-taking lens 42. Extending rearwardly from the front wall 41 is a top wall 52 having arranged thereon a centrally disposed flash unit support pedestal 54 in which is disposed a well-known flash socket 56 (see FIGS. 2 and 5).

The flash socket 56 is shaped as an elongated, downwardly extending slot having a plurality of electrical contacts 58 arranged along one side thereof as is more fully described, for example, in U.S. Pat. No. 3,748,980 issued to Edison R. Brandt et al. on July 31, 1973 and entitled "Flash Socket Assembly." The electrical contacts 58 connect with the camera's automatic exposure control system and are adapted to engage portions of the strobe-light 10 in a manner to be described.

A collapsible viewing device 60 (FIGS. 1 and 2) more fully described in U.S. Pat. No. 3,783,760 issued to Joseph H. Allen et al. on Jan. 8, 1974 and entitled "Collapsible Viewing Device," is mounted on the camera's upper housing member 18. The viewing device 60 includes a cover 70, a plurality of telescoping blades 62, and an eye lens 64 all of which are arranged to pivot about a pair of pivots 68 (only one shown) so that the viewing device 60 may be moved, in response to pivoting the cover 70, between a folded-inoperative position (not shown) and its extended-operative position illustrated in FIGS. 1, 2 and 5. When extended, the viewing device 60 permits reflex viewing, through the camera's objective-taking lens 42, of any scene to be photographed.

The cover 70 includes a generally rectangular, thin-walled top 76 from which downwardly depends a front wall section 71, a rear wall section 73, and a pair of longitudinally extending side walls 72—all of which are also thin-walled, and in combination with the top 76, define a cavity for receiving the various components of the viewing device 60 when it is folded. To fold the viewing device is a simple operation requiring only the application of a small force near the forward end of the cover 70 and generally perpendicular to its top 76. This causes the cover 70 to rotate about the pivots 68 which in turn causes the blades 62 and the eye lens 64, via a guide link 66, to fold into the cavity formed in the cover 70.

From the foregoing description of the camera 12, it is apparent that the shutter-lens housing 20 has a high component density which together with the clean exterior shape of the camera 12, the nature of the collapsible viewing device 60, the necessity for accessibility to the camera's various controls, and the general desirability of balance for handling during operation represent material obstacles to convenient strobe-light attachment. However, the strobe-light 10 overcomes these obstacles in a manner which may best be understood by now referring to FIGS. 1, 2 and 5.

As can be seen in these figures, the strobe-light 10 comprises an elongated housing 80 that includes a forward section 81 and a rear section 83 which are connected to form a protective enclosure for housing the strobe-light's interior components and, in general, for defining its outward appearance.

The forward section 81 includes a front wall 82 having a generally rectangular aperture 84 therein, and the rear section 83 includes a rear wall 86 which generally slants toward the front wall 82. Extending between the front wall 82 and the rear wall 86 are a generally flat bottom wall 90 and a top wall 88 spaced from the bottom wall 90 and gently sloped from the strobe-light's front to rear. Connecting the top and bottom walls 88 and 90 respectively are a pair of spaced apart side walls 92 (see FIG. 3).

The overall shape of the housing 80 generally tapers from front to rear to ease its handling, and its length is preferably chosen so that, when attached to the camera 12, its front end is generally flush with the shutter-lens housing's front wall 41 and no part of its rear end extends rearwardly beyond the rear wall 73 of the viewing device's cover 70 so as not to interfere with the photographer's ability to use the viewing device 60—particularly his ability to get his eye close enough to the eye lens 64 without inadvertently collapsing the viewing device 60.

Figure 3:
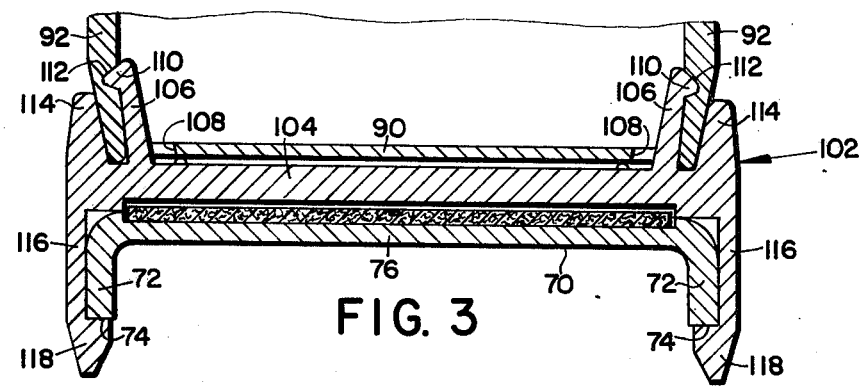
FIG. 3 is an enlarged, fragmentary cross-sectional view, taken generally along line 3—3 of FIG. 2, of the strobe-light apparatus of the invention and the camera of FIG. 1.

The bottom wall 90 is shaped so as to generally decrease in width from front to rear and has a maximum width generally the same as that of the viewing device's cover 70 (see FIG. 3).

Mounted within the elongated housing 80 and in predetermined alignment with the aperture 84 is an elongated, cylindrical flash tube 94 for illuminating a scene to be photographed. The flash tube 94 is arranged with its longitudinal axis generally perpendicular to the housing's bottom wall 90 so that, when the strobe-light 10 is attached to the camera 12 and the camera 12 is held in its normal picture-taking attitude (FIG. 1), the flash tube 94 is generally perpendicular to the horizon. Because of parallax between the optical axis, OA, of the objective taking lens 42 and the flash tube 94, this flash tube mounting arrangement is preferred for promoting better a distribution of illumination over the picture area, particularly at close distances.

Figure 2:
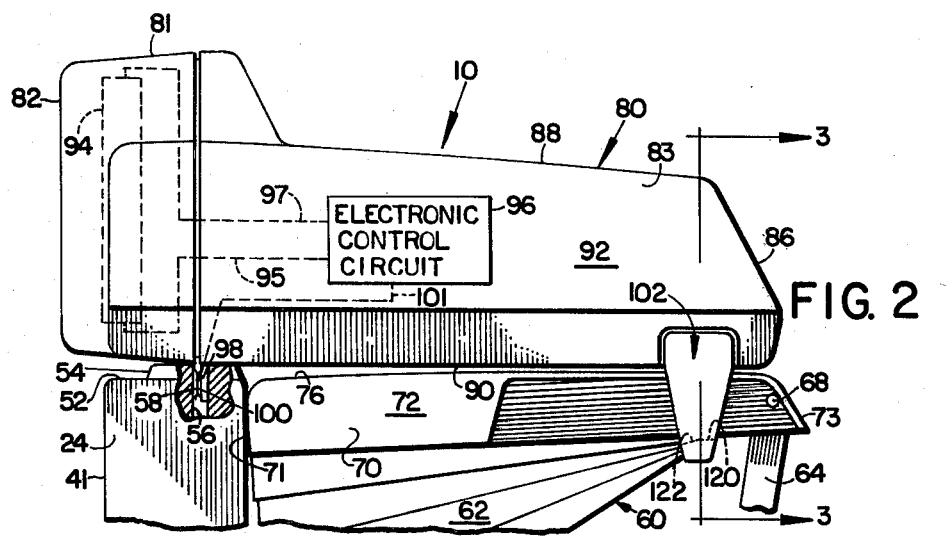
FIG. 2 is a side-elevational view of the strobe-light apparatus of the invention attached to a portion of the camera of FIG. 1.
Figure 5:
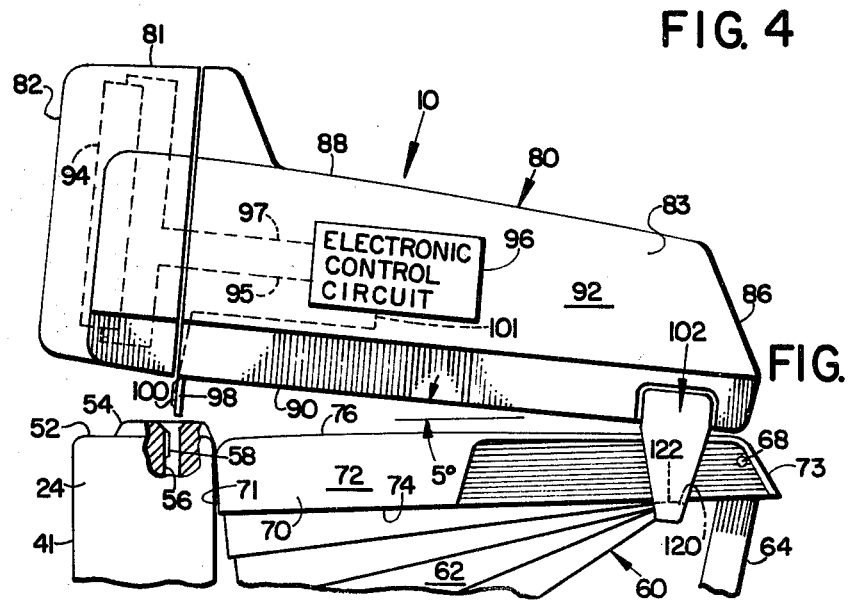
FIG. 5 is a side-elevational view illustrating the strobe-light apparatus of the invention partially attached to a portion of the camera of FIG. 1.

Referring now to FIGS. 2 and 5, there is shown schematically at 96 well-known control means in the form of an electronic control circuit that is responsive to a signal from the cameras automatic exposure control circuit for energizing the flash tube 94. The circuit 96 is connected to the flash tube 94 via a pair of leads, 95 and 97, and may be of the type more fully described in, for example, U.S. Pat. No. 4,064,519 issued to Richard C. Kee on Dec. 20, 1977 and entitled "Regulated Strobe For Camera With Sixth Flash Inhibit." The power required to operate the circuit 96 and flash tube 94 may be derived from the film cassette's battery as explained more fully in the patent to Kee, supra, or, alternatively, may be derived from separate batteries.

Mounted adjacent the elongated housing's front wall 82 and extending downwardly and generally perpendicular to its bottom wall 90 is an elongated, blade-like flash plug 98. The flash plug 98 is structured to fit the camera's flash socket 56 so that, when inserted into the flash socket 56, the flash plug 98 and the flash socket 56, in combination, support the front end of the strobe-light 10 on the camera 12. The flash plug 98 is provided with electrical contacts 100 (FIG. 5) for mating with the flash socket's electrical contacts 58 to provide an electrically conductive path, which includes a lead, schematically shown at 101 running from the circuit 96 to the contacts 100, along which the signal from the camera's automatic exposure control system is transmitted to the strobe-light control circuit 96. Additionally, contacts (not shown) may be provided adjacent the contacts 100 to furnish a conducting path from the film cassette's battery to power the strobe-light 10.

Means for releasably attaching the rear end of the strobe-light 10 to the rear end of the viewing device's cover 70 are provided in the form of a gripper 102.

Referring now to FIGS. 1 and 2, it can be seen that the gripper 102 is located adjacent the elongated housing's rear wall 86 and depends downwardly from the housing's bottom wall 90.

In FIG. 3, the gripper 102 is shown as a generally "H"-shaped member of unitary construction, preferably molded of a suitable plastic material, comprising a slender beam section 104 which extends transverse the length of the elongated housing 80.

Depending upwardly from the beam section 104 are a pair of spaced apart flexible fingers 106 each of which extends through a correspondingly spaced apart hole 108 located in the housing's bottom wall 90. Each flexible finger 106 includes a lug portion 110 which fits into a corresponding, complementary-shaped, cavity 112 located in a respective side wall 92.

Also upwardly depending from the beam section 104 are another pair of spaced apart rigid members 114 each of which is configured to cooperate with a respective flexible finger 106 to form a channel adapted to trap a portion of a corresponding side wall 92 therein.

The upper surface of the beam 104 is selectively shaped to fit the contour of the elongated housing's bottom wall 90. In this manner, the elongated housing 80 and the gripper 102 include portions which form complementary configured snap-type fasteners for connecting one to the other.

Depending downwardly from the beam section 102 are a second pair of spaced apart flexible fingers 116 which are generally perpendicular to the housing's bottom wall 90. Each flexible finger 116 includes a wedge-shaped end portion 118 which includes a flat 120 that is adapted to engage corresponding edge 74 of a side wall 72 of the viewing device's cover 70.

The wedge shaped end portions 118 operate to force the flexible fingers 116 away from one another in response to pushing the rear end of the strobe-light 10 generally perpendicular to the viewing device's cover 70 thereby allowing the strobe-light's rear end to be snap-connected to the viewing device's cover 70. Structured in the foregoing manner, the flexible fingers 116 of the gripper 102 have inwardly-facing sections shaped to fit a corresponding longitudinal lower edge 74 of a side wall 72 of the viewing device's cover 70.

Figure 6:
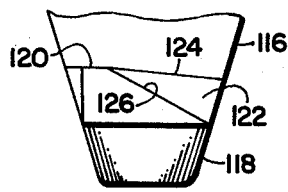
FIG. 6 is an enlarged side-elevational view of a portion of the invention.
Figure 4:
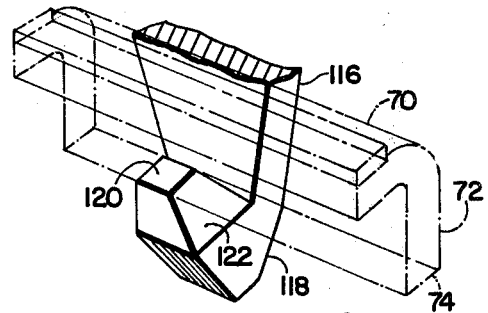
FIG. 4 is an enlarged perspective view of a portion of the invention.

Referring now to FIGS. 4 and 6, it can be seen that each wedge-shaped end portion 118 of the flexible fingers 116 includes a flat camming surface 122, defined by edges 124 and 126 thereof, which is disposed at an oblique angle with respect to a corresponding longitudinal side wall 72 of the viewing device's cover 70. The camming surfaces 122 operate to automatically effect the release of the gripper 102 from the cover 70 in response to rotating the strobe-light 10 about its rear end in a clockwise sense as shown in FIG. 5. The camming surfaces 122, in effect, force the flexible fingers 116 away from one another after the strobe-light 10 is rotated through approximately 5 degrees, the angle at which the flash plug 98 just clears the flash socket 56 (see FIG. 5).

The lower surface of the beam section 104 is selectively shaped to fit the contour of the viewing device cover 70 as best shown in FIG. 3.

In the foregoing manner, means have been provided for releasably gripping the lower edges 74 of the longitudinal side walls 72 of the viewing device's cover 70, adjacent the rear end of the cover 70, to support the rear end of the strobe-light 10 adjacent the rear end of the viewing device's cover 70. Moreover, these means in the form of the gripper 102 are structured either to be initially slidably engaged with the cover's longitudinal side walls 72 and then rotated with respect thereto so that the strobe-light's rear end can be slid into engagement with the cover's (70) rear end after which the strobe-light 10 can be rotated with respect to its rear end to insert its flash plug 98 into the camera's flash socket 56 to complete the attachment of the strobe-light 10 to the camera 12 or, alternatively, to initially effect a snap-type connection about the lower edges 74 of the longitudinal side walls 72 so that the strobe-light's rear end can be engaged with the cover's longitudinal side walls 72 by pushing the strobe-light's rear end against the cover 70 in a direction generally perpendicular to the cover 70 after which the strobe-light 10 can be rotated with respect to its rear end to insert its flash plug 98 into the camera's flash socket 56 to complete the attachment of the strobe-light 10 to the camera 12. Thus, two alternate, convenient ways of attaching the strobe-light 10 to the camera 12 are possible with the foregoing structure.

To detach the strobe-light 10 from the camera 12, the user first removes the flash plug 98 from flash socket 56 and thereafter either rotates the strobe-light 10 about its rear end to disengage the gripper 102 via the previously described camming arrangement or simply slides the strobe-light 10 rearwardly until it separates from the cover 70.

One of the advantages of the strobe-light 10 can be seen in FIG. 2 which shows that its rear end is positioned with respect to the viewing device's cover 70 so as not to cause the cover 70 to pivot thereby preventing movement of the viewing device 60 toward its folded-inoperative position. Also because of the elongated shape of the strobe-light 10, its weight is generally distributed along the length of the camera 12 thereby improving the balance and thus handling of the combination of the strobe-light 10 and the camera 12.

Certain changes may be made in the above-described embodiments without departing from the scope of the invention, and those skilled in the art may make still other changes according to the teachings of the present invention. Therefore, it is intended that all matter contained in the above description or shown in the accompanying drawings shall be interpreted as illustrative and not in a limiting sense.

What is claimed is:

1. Photographic strobe-light apparatus for use with a camera of the type which includes a shutter-lens housing having a front wall behind which is mounted an automatic exposure control system and through which extends an objective-taking lens having an optical axis therethrough and a rearwardly extending top wall having a centrally disposed, downwardly extending, elongated flash socket which includes electrical contacts for providing an electrical signal from the automatic exposure control system to said apparatus during an exposure cycle of the camera, the camera additionally including a viewing device which includes an elongated cover of given width and a pair of spaced apart longitudinal side walls extending in a direction from the camera's front end to its rear end, said apparatus comprising:

an elongated housing including a front wall having an aperture therein, a rear wall spaced from said front wall, and a generally flat bottom wall extending between said front and rear walls;

a flash tube mounted within said elongated housing in predetermined alignment with said aperture of said front wall;

control means, responsive to the signal from the camera's automatic exposure control system, for energizing said flash tube;

an elongated, blade-like flash plug mounted adjacent said elongated housing's front wall and extending downwardly and generally perpendicular to said bottom wall of said elongated housing, said plug being structured to fit the camera's flash socket so that, when inserted into the flash socket, said flash plug and the flash socket, in combination, support the front end of said apparatus on the camera, said flash plug also having electrical contacts for mating with the electrical contacts of the flash socket to provide an electrically conducting path along which the signal from the camera's automatic exposure control system is transmitted to said apparatus's control means; and means for releasably gripping the lower edges of the longitudinal side walls of the viewing device's cover, adjacent the rear end of the cover, to support the rear end of said apparatus adjacent the rear end of the viewing device's cover, said gripping means being located adjacent said rear wall of said elongated housing, depending downwardly from said elongated housing's bottom wall, and structured either to be initially slidably engaged with the cover's longitudinal side walls and then rotated with respect thereto so that said apparatus's rear end can be slid into engagement with the cover's rear end after which said apparatus can be rotated with respect to its rear end to insert said flash plug into the flash socket to complete the attachment of said apparatus to the camera or alternatively to initially effect a snap-type connection about the lower edges of the cover's longitudinal side walls so that said apparatus's rear end can be engaged with the cover's longitudinal side walls by pushing said apparatus rear end against the cover in a direction generally perpendicular to the cover after which said apparatus can be rotated with respect to its rear end to insert said flash plug into the flash socket to complete the attachment of said apparatus to the camera, said gripping means comprising a pair of spaced apart flexible fingers each cantilevered from said housing's bottom wall, extending downwardly therefrom and generally perpendicular thereto, each of said fingers having inwardly-facing sections shaped to fit a corresponding longitudinal lower edge of a side wall of the viewing device's cover, each finger additionally including wedge-shaped end portions for forcing said fingers away from one another in response to pushing said apparatus's rear end generally perpendicular to the viewing device's cover thereby allowing said apparatus's rear end to be snap-connected to the viewing device's cover, said gripping means additionally including camming means structured to automatically effect the release of said gripping means in response to rotation of said apparatus about its rear end by first detaching said apparatus front end from the camera flash socket and then rotating the apparatus front end with respect to its rear end, said camming means comprising a pair of spaced-apart, opposed planar camming surfaces one each of which is formed in a corresponding one of said wedge-shaped end portions of said flexible fingers, each of said planar camming surfaces being disposed at an oblique angle with respect to a corresponding longitudinal side wall of the viewing device's cover to force said fingers away from one another in response to rotating said apparatus.

2. The apparatus of claim 1 wherein said gripping means is a generally "H"-shaped member of unitary construction including a slender beam section which extends transverse to the elongated direction of said elongated housing, said beam section having an upper surface which is selectively shaped to fit the contour of said elongated housing's bottom wall and a lower surface selectively shaped to fit the contour of the viewing device's cover, and wherein said flexible fingers are cantilevered from either end of said beam section.

* * * * *